United States Patent Office 3,069,237
Patented Dec. 18, 1962

3,069,237
METHOD FOR THE PREPARATION OF DIBORANE
Robert D. Schultz, East Whittier, and Carl L. Randolph, Jr., Whittier, Calif., assignors to Aerojet-General Corporation, Azusa, Calif., a corporation of Ohio
No Drawing. Filed May 16, 1955, Ser. No. 508,809
15 Claims. (Cl. 23—204)

This invention relates to a new and improved method of preparing diborane.

Diborane is an excellent high energy fuel. Unfortunately, however, its use has been severely limited due to a lack of a convenient and inexpensive method for preparing it in high yield.

Heretofore, diborane has been prepared by reacting alkali metal borohydrides with hydrogen chloride gas at room temperature or with liquid hydrogen chloride at a temperature of −78° C. These methods are very slow, requiring reaction times of from 16 to 24 hours. In addition, the separation of diborane from the resulting 70% diborane–30% hydrogen chloride azeotropic mixture is very difficult.

It has long been desired as a matter of cost, convenience and commercial feasibility to produce diborane by using sulfuric acid as the protolyzing acid, preferably at room temperature. Unfortunately, when alkali-metal borohydrides were reacted with concentrated sulfuric acid, boron oxides were produced with explosive violence, rather than diborane. In an attempt to avoid oxidation, dilute sulfuric acid was substituted in the reaction. Although the borohydride-dilute sulfuric acid reaction was not explosive, hydrolysis occurred producing boric acid instead of diborane.

We have now found that diborane is rapidly and safely produced in good yield by reacting a metal borohydride with concentrated sulfuric or chlorosulfonic acid in the presence of a reaction moderator. The reaction proceeds in accordance with the general reaction scheme set forth below:

$$MBH_4 + H_2SO_4 \rightarrow B_2H_6 + MSO_4$$

wherein M is a metal radical. Due to the non-volatile characteristic of sulfuric acid, an azeotropic mixture of gases is avoided. Although rapid, the reaction proceeds smoothly and gently without sparking, flaming or explosions.

As a matter of convenience, alkali and alkaline earth metal borohydrides are usually employed as starting materials. Commercial grade sulfuric acid, ordinarily containing from about 95% to about 98% by weight pure hydrogen sulfate and about 5% to about 2% by weight water can be used as the protolyzing acid.

The reaction moderators of this invention are polyether alcohols having the general formula:

R—O—(A—O)$_x$—A'—OH wherein R is a hydrogen, aryl or alkaryl radical, A and A' are alkylene radicals and $x$ is a whole number. Polyether alcohols useful as modifiers include: the polyalkylene glycols such as polyethylene glycol, polypropylene glycol and polybutylene glycol; the aryl polyalkylene glycols such as phenyl pentaethoxy ethanol and phenyl decaethoxy ethanol; and the alkaryl polyalkylene glycols such as hexylphenoxy octaethoxy methanol, octylphenoxy pentaethoxy ethanol, and isoheptylphenoxy undecaethoxy ethanol; and mixtures thereof. As a matter of convenience, the polyether alcohols are usually employed in homogeneous mixtures.

The metal borohydrides useful in the practice of this invention are the alkali and alkaline earth metal borohydrides such as sodium borohydride, potassium borohydride, lithium borohydride, magnesium borohydride, calcium borohydride, etc.

In accordance with the present invention, concentrated sulfuric acid containing a polyether alcohol, usually in an amount of from about 2% to about 10% by weight of the sulfuric acid, is reacted with a metal borohydride and diborane gas is evolved. The preferred method of conducting the reaction is to dissolve the polyether alcohol in the concentrated sulfuric or chlorosulfonic acid, heating if necessary to effect solution. Mixtures of chlorosulfonic and sulfuric acid may also be used if desired. The reaction is usually conducted in a reactor equipped with a gas outlet leading to a low temperature trap. The acid solution is placed in the reactor and finely divided borohydride added with agitation. During the course of the reaction, a gentle evolution of hydrogen and diborane gases takes place. These gases are vented through the gas outlet and collected in the low temperature trap. If desired, the reaction can also be conducted in vacuum or a nitrogen atmosphere as well as in air.

The mechanism by which these polyether alcohols modify the sulfuric or chlorosulfonic acid-borohydride reaction has not been definitely established. It is believed, however, that these compounds reduce the surface tension of the protolyzing acid and form a coating about the borohydride particles. The reactants diffuse into this coating. In addition bisulfate ions, produced by the dissociation of the sulfuric acid, become concentrated in the coating, thus providing a buffer in the reaction zone. By diffusion of the reactants and buffering of the reaction, the protolysis of the borohydride yielding diborane takes place without oxidation or hydrolysis.

To more clearly illustrate the invention, the following examples are presented. It is to be understood, however, that these examples are presented merely as a means of illustration, and are not intended to limit the scope of the invention in any way.

EXAMPLE I

*Polypropylene Glycol Moderator*

The protonolysis of sodium borohydride with 96.5% concentrated sulfuric acid using 0.6% polypropylene glycol, M.W. 1200, as a moderator was carried out under nitrogen flow by dropping 5.5 gm. of 95% pure sodium borohydride into 80 cc. of the moderated acid. A stirring speed of approximately 100 to 200 r.p.m. was used for the Hershberg wire stirrer during the 40 minute period of addition of the borohydride, and high-speed stirring was used afterward during a 20 minute nitrogen flushing period. The 500 cc. 3-neck Pyrex reaction vessel was immersed in water at 25° C. to provide cooling. The reaction was smooth and quiet, no sparking occurred, foaming was not excessive, and the moderated acid solution did not change color during the reaction. The diborane yield based on the sodium borohydride introduced into the system was 82%. Some losses were known to occur, hence the actual yield of diborane is probably close to 85%. The diborane is obtained in high purity with a vapor pressure of 229 mm. at −112° C. In a preliminary experiment, several 8-mesh crystals of sodium borohydride were dropped into 9 cc. of moderated acid in vacuum without stirring. An infrared spectogram of the evolved gas was taken. Sulfur dioxide and hydrogen sulfide were found to be absent.

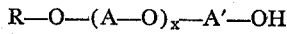

EXAMPLE II

*Polypropylene Glycol Moderator*

The reaction was carried out by dropping 8-mesh crystals of sodium borohydride into a test tube holding 1 cc. mixture of commercial grade sulfuric acid and polypropylene glycol, M.W. 975–1075, in an amount of about 3% by weight of the total acid mixture. There was a gentle evolution of gas, which was identified as diborane by the infrared spectrum.

EXAMPLE III

*Polyethylene Glycol Moderator*

The reaction was carried out by dropping 8-mesh crystals of sodium borohydride into a test tube containing a 1 cc. mixture of commercial grade sulfuric acid and polyethylene glycol, M.W. 285–315, in an amount of about 3% by weight of the total acid mixture. There was a gentle evolution of gas, which was identified as diborane by the infrared spectrum.

EXAMPLE IV

*Polypropylene Glycol Derivative Moderator*

The reaction was carried out by dropping 8-mesh crystals of sodium borohydride into a test tube holding a 1 cc. mixture of commerical grade sulfuric acid and a polypropylene glycol derivative, sp. gr. .995–937 (Flexol 400, commercial product of Union Carbide and Carbon Corporation), in an amount of about 3% by weight of the total acid mixture. There was a gentle evolution of gas, which was identified as diborane by the infrared spectrum.

EXAMPLE V

*Iso-Octylphenoxy Tetraethoxy Ethanol Moderator*

The reaction was carried out by dropping 8-mesh crystals of sodium borohydride into a test tube holding a 1 cc. mixture of commercial grade sulfuric acid and iso-octylphenoxy tetraethoxy ethanol, in an amount of about 3% by weight of the total acid mixture. There was a gentle evolution of gas, which was identified as diborane by the infrared spectrum.

EXAMPLE VI

*Octadecylphenoxy Decaethoxy Ethanol Moderator*

The reaction was carried out by dropping 8-mesh crystals of sodium borohydride into a test tube holding a 1 cc. mixture of commercial grade sulfuric acid and octadecylphenoxy decaethoxy ethanol, in an amount of about 3% by weight of the total acid mixture. There was a gentle evolution of gas, which was identified as diborane by the infrared spectrum.

It will be seen from the above discussion that we have invented a means of moderating the reaction of borohydrides with sulfuric or chlorosulfonic acid so that diborane can be produced safely, rapidly, and conveniently. Due to the inexpensiveness and availability of sulfuric acid, ease of running the reaction at ordinary temperatures, and the convenience of recovering diborane from the reaction mixture, the above described method of preparing diborane will find valuable use in the production of this high energy fuel. As well as being useful as a high energy fuel, diborane also finds valuable use in vulcanizing rubber, as disclosed in United States Patent No. 2,558,559.

We claim:

1. A method of preparing diborane which comprises reacting a metallic borohydride selected from the group consisting of the alkali and alkaline earth metal borohydrides with a protolyzing acid selected from the group consisting of concentrated sulfuric acid, concentrated chlorosulfonic acid and mixtures thereof in the presence of a polyether alcohol having the general formula:

$$R\text{—}O\text{—}(A\text{—}O)_x\text{—}A'\text{—}OH$$

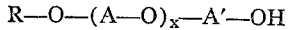

wherein R is a radical selected from the group consisting of hydrogen, aryl and alkaryl radicals, A and A' are alkylene radicals and $x$ is a whole number.

2. The method of claim 1 wherein the polyether alcohol is present in an amount of from about 2% to about 10% by weight of the protolyzing acid.

3. A method of preparing diborane which comprises reacting a metallic borohydride selected from the group consisting of the alkali and alkaline earth metal borohydrides with a protolyzing acid selected from the group consisting of concentrated sulfuric acid, concentrated chlorosulfonic acid and mixtures thereof in the presence of a polyether alcohol having the general formula:

$$HO\text{—}(A\text{—}O)_x\text{—}A'\text{—}OH$$

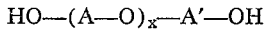

wherein A and A' are alkylene radicals and $x$ is a whole number.

4. A method of preparing diborane which comprises reacting a metallic borohydride selected from the group consisting of the alkali and alkaline earth metal borohydrides with a protolyzing acid selected from the group consisting of concentrated sulfuric acid, concentrated chlorosulfonic acid and mixtures thereof in the presence of a polyether alcohol having the general formula:

$$R\text{—}O\text{—}(A\text{—}O)_x\text{—}A'\text{—}OH$$

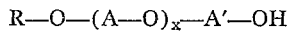

wherein R is an aryl radical, A and A' are alkylene radicals and $x$ is a whole number.

5. A method of preparing diborane which comprises reacting a metallic borohydride selected from the group consisting of the alkali and alkaline earth metal borohydrides with a protolyzing acid selected from the group consisting of concentrated sulfuric acid, concentrated chlorosulfonic acid and mixtures thereof in the presence of a polyether alcohol having the general formula:

$$R\text{—}O\text{—}(A\text{—}O)_x\text{—}A'\text{—}OH$$

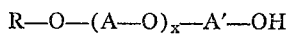

wherein R is an alkaryl radical, A and A' are alkylene radicals and $x$ is a whole number.

6. A method of preparing diborane which comprises reacting a metallic borohydride selected from the group consisting of the alkali and alkaline earth metal borohydrides with a protolyzing acid selected from the group consisting of concentrated sulfuric acid, concentrated chlorosulfonic acid and mixtures thereof in the presence of a polyether alcohol selected from the group consisting of polyalkylene glycol, aryl polyalkylene glycol, alkaryl polyalkylene glycol and mixtures thereof.

7. A method of preparing diborane which comprises reacting a metallic borohydride selected from the group consisting of alkali and alkaline earth metal borohydrides with a mixture comprising: a protolyzing acid selected from the group consisting of concentrated sulfuric acid, concentrated chlorosulfonic acid and mixtures thereof; and a polyether alcohol selected from the group consisting of polyalkylene glycol, aryl polyalkylene glycol, and alkaryl polyalkylene glycol, said polyether alcohol being present in an amount of from about 2% to about 10% by weight of the acid.

8. A method of preparing diborane which comprises reacting sodium borohydride with concentrated sulfuric acid in the presence of polypropylene glycol.

9. The method of claim 8 wherein the polypropylene glycol is present in an amount of from about 2% to about 10% by weight of the sulfuric acid.

10. A method of preparing diborane which comprises reacting sodium borohydride with concentrated sulfuric acid in the presence of polyethylene glycol.

11. The method of claim 10 wherein the polyethylene glycol is present in an amount of from about 2% to about 10% by weight of the sulfuric acid.

12. A method of preparing diborane which comprises reacting sodium borohydride with concentrated sulfuric acid in the presence of isooctylphenoxy tetraethoxy ethanol.

13. A method of preparing diborane which comprises reacting sodium borohydride with concentrated sulfuric acid in the presence of octadecylphenoxy decaethoxy ethanol.

14. A method of preparing diborane which comprises reacting sodium borohydride with concentrated sulfuric acid in the presence of from about 2% to about 10% isooctylphenoxy tetraethoxy ethanol by weight of the sulfuric acid.

15. A method of preparing diborane which comprises reacting sodium borohydride with concentrated sulfuric acid in the presence of from about 2% to about 20% octadecylphenoxy decaethoxy ethanol.

References Cited in the file of this patent

UNITED STATES PATENTS

| | | |
|---|---|---|
| 2,543,511 | Schlesinger et al. | Feb. 27, 1951 |
| 2,544,472 | Schlesinger et al. | Mar. 6, 1951 |
| 2,880,068 | Chivas | Mar. 31, 1959 |

OTHER REFERENCES

Metal Hydrides, Inc., Bulletin 502A on $NaBH_4$, 2 pages received in Patent Office February 15, 1950.

Hurd: "Chemistry of the Hydrides," page 162 (1952), pub. by John Wiley & Sons, N.Y.

Kirk-Othmer: "Encyclopaedia of Chemical Technology," 1948, vol. 2, pp. 593, 594.

Schlesinger et al.: "Journal of the American Chemical Society," vol. 75, pp. 186–190 (January 5, 1953).

Curme et al.: "Glycols," 1952, pp. 168–169, 176, 276.

Hurd: "Chemistry of the Hydrids," page 163 (1952), J. Wiley & Sons, N.Y.C.